Aug. 22, 1933.   H. J. FARRAR   1,924,031

KNEE REST

Filed Sept. 30, 1932

Herbert J. Farrar, INVENTOR

BY Victor J. Evans & Co.

ATTORNEY

Patented Aug. 22, 1933

1,924,031

UNITED STATES PATENT OFFICE 1,924,031

KNEE REST

Herbert J. Farrar, Miami, Fla.

Application September 30, 1932
Serial No. 635,665

2 Claims. (Cl. 74—81)

This invention relates to knee rests, and has for the primary object, the provision of a device of the above stated character which may be easily and quickly applied to the gear shifting lever of an automobile so that the driver of the automobile may lean the leg employed for controlling the automobile against the device and thereby be relieved of the physical strain of maintaining the leg in a driving position, thus affording comfort to the driver when operating the automobile over long periods of time.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a knee rest applied to a shifting lever and constructed in accordance with my invention.

Figure 1:
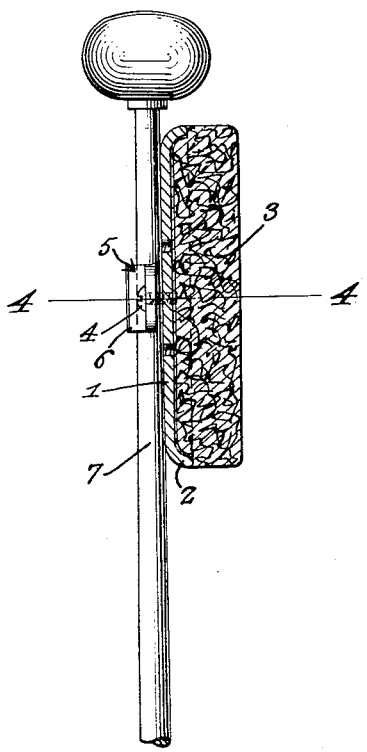
Figure 2:
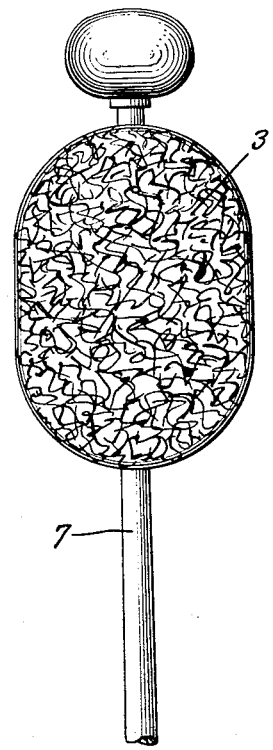
Figure 2 is a front elevation illustrating the same.
Figure 3:
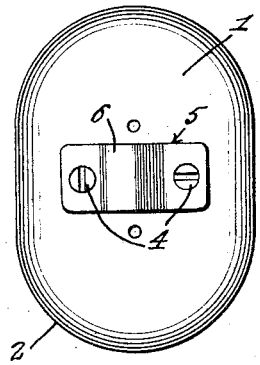
Figure 3 is a plan view illustrating the means of attaching the rest to the shifting lever.
Figure 4:
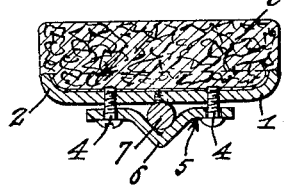
Figure 4 is a sectional view on the line 4—4 of Figure 1.

Referring in detail to the drawing, the numeral 1 indicates a supporting plate or base provided with marginal flanges 2 cooperating therewith and forming a cup-shaped seat to receive a cushion element 3 which overlies the marginal flanges and provides an efficient cushion rest. The plate 1 is provided with screw threaded openings to receive bolts or studs 4 which embed within the cushion element to aid in retaining the latter in the cup-shaped seat. Other securing means, such as adhesive may be employed for firmly anchoring the cushion element 3 within the seat. A clamping plate 5 is apertured to receive the bolts 4 and is provided with a V-shaped offset portion 6 to receive therein a gear shift lever 7 and by adjusting the bolts 4 in the plate 1 the tension of the clamping plate on the shifting lever may be varied either to secure the device against accidental movement or to loosen the device for adjustment on the shifting lever. The device is preferably applied to the shifting lever adjacent the upper end thereof and opposite to the driver's leg employed for controlling the speed of the engine of an automobile so that the driver may rest the leg against the cushion element 3, relieving the driver of physical strain while maintaining the leg in driving position.

While I have shown and described the preferred embodiment of my invention, it will be understood that minor changes in construction, combination and arrangement of parts may be made without departing from the spirit and scope of my invention, as claimed.

Having described the invention, I claim:

1. A knee rest comprising a plate, marginal flanges on the plate cooperating with the latter in forming a cup-shaped seat, a cushion element secured in said seat and overlying the marginal flanges and a clamp removably secured to the plate for detachably and adjustably securing the plate to a shifting lever for positioning the cushion element whereby a person may rest the knee of one leg thereagainst when employing the foot of the leg for actuating the accelerator.

2. A device for the purpose set forth comprising a cup consisting of a plate having threaded openings therethrough and provided with marginal flanges, a cushion held in the cup and extending therefrom and overlying the flanges thereof, a clamp adapted to fit around a lever, and securing screws inserted through the ends of the clamp and engaged in and passing through the threaded openings in the plate to enter the cushion whereby to secure the plate to the lever and aid in maintaining the cushion in place.

HERBERT J. FARRAR.